United States Patent [19]

Ihm et al.

[11] Patent Number: 5,397,828
[45] Date of Patent: Mar. 14, 1995

[54] BIAXIALLY STRETCHED POLYESTER FILM

[75] Inventors: Dae W. Ihm; Jeong L. Kim, both of Seoul; Seung B. Jun, Kyunggi, all of Rep. of Korea

[73] Assignee: Cheil Synthetics Inc., Kyungsan, Rep. of Korea

[21] Appl. No.: 264,917

[22] Filed: Jun. 24, 1994

[30] Foreign Application Priority Data

Jul. 15, 1993 [KR] Rep. of Korea .................. 93-13291

[51] Int. Cl.⁶ .................. B29C 71/00; C08J 3/20
[52] U.S. Cl. .................. 524/441; 264/235.8; 264/290.2; 428/480; 521/91; 521/92; 521/182; 524/493; 524/604; 524/605
[58] Field of Search ........... 524/441, 493, 604, 605; 264/235.8, 290.2; 521/182, 91, 92; 428/480

[56] References Cited

U.S. PATENT DOCUMENTS

| | | | |
|---|---|---|---|
| Re. 34,727 | 9/1994 | Utsumi et al. | 428/910 |
| 4,421,887 | 12/1983 | Horie et al. | 524/317 |
| 4,606,976 | 8/1986 | Hensel | 428/482 |
| 4,677,188 | 6/1987 | Usumi et al. | 428/480 |
| 4,960,636 | 10/1990 | Tomitaka et al. | 528/272 |
| 5,023,291 | 6/1991 | Sakamoto et al. | 524/604 |
| 5,096,773 | 3/1992 | Sakamoto | 428/480 |
| 5,164,439 | 11/1992 | Sakamoto et al. | 524/428 |
| 5,312,893 | 5/1994 | Hamano et al. | 428/480 |

*Primary Examiner*—Morton Foelak
*Attorney, Agent, or Firm*—Nikaido, Marmelstein, Murray & Oram

[57] ABSTRACT

A biaxially stretched polyester film is disclosed.

The biaxially stretched polyester film comprises substantially spherical silica particles of colloidal state having average diameters ranging from approximately 20 nm to approximately 200 nm in amounts ranging from approximately 0.005% to approximately 1.0% by weight based on the total weight of the polyester; and alumina particles having average diameters ranging from approximately 50 nm to approximately 500 nm in amounts ranging from approximately 0.05% to approximately 5.0% by weight, the average diameter of the alumina particles being larger than that of the silica particles.

The biaxially stretched film prepared according to the present invention has excellent surface properties such as slip property and abrasion resistance, so that the film may be used for manufacturing final products without scratches and white powders occurring thereon.

1 Claim, No Drawings

BIAXIALLY STRETCHED POLYESTER FILM

BACKGROUND OF THE INVENTION

1. Field of the Invention

The present invention relates, in general, to a biaxially stretched polyester film excellent surface properties and, more particularly, to a biaxially stretched polyester film superior in slip property and abrasion resistance.

2. Description of the Prior Art

By virtue of the superior intrinsic, physical and chemical properties of polyester which polyethylene terephthalate is representative of, polyester is, in general, used to being formed into a film which is used for various purposes, for example, a base film for a magnetic tape, a graphic art film, a condenser film, a package film and the like.

However, in spite of its excellent intrinsic properties, the film which is molded of only polyethylene terephthalate, is lack of slip property and is inferior in abrasion resistance, so that workability becomes poor in its production processes and in processing therefor.

The slip property and the abrasion resistance of polyester film have a great influence on the film production process and the processing therefor as well as on the quality of an article manufactured therewith. The inferiority of such properties in polyester film would leave scratches on the film during a processing step for the film, which are caused by the friction between a roll and the film, and lead to the generation of a great quantity of white powder.

Particularly, when a magnetic tape that is manufactured by coating a polyester film with a magnetic layer is running in a recording or a playback apparatus in order to record magnetic signals thereon or to playback the magnetic signals, the magnetic tape comes into long contact with the internal parts of the apparatus, such as a head drum and a guide roll. This contact may cause the magnetic tape to become degraded. For example, scratches and white powders are more likely to occur on the surface of the magnetic tape, and these inferiorities are lead to the drop out of the magnetic signals. In addition, repetitive or long time use of the magnetic tape makes the friction coefficient of the magnetic tape increase, deteriorating the traveling ability of the magnetic tape.

In an effort for solving the above-mentioned problems, there has been taken order to reduce the contact areas between the films themselves made of polyester and between the film and the roll by applying to the surface of the film protrusions with the improvement of the slip property and the abrasion resistance of the film.

Prior arts have sought ways of applying the protrusions to the surface of film and thus, improving the film surface properties to a satisfactory level. Prior arts are divided to two kinds.

One of them is a method of forming inner particles that inactivated fine particles are deposited from catalyst residues during the production of polyester.

Another is a method of casting outer particles that inactivated fine particles are added during the production of polyester.

In the method of forming inner particles, there is such an advantage that it is not necessary to pulverize and grade the particles. Moreover, the film formed by the method of forming inner particles relatively has good abrasion resistance since the particles deposited on the film have a good affinity for the polymer and thus, there are little generated the white powders caused by the falling of the particles. This method, however, has difficulty in controlling the diameter of the deposited particles, and there occur differences among the batches which are operated according to the method.

The method of casting outer particles, in which inactivated inorganic particles such as calcium carbonate, calcium sulfate, barium sulfate, kaolin, silica, talc, titanium dioxide, alumina and the like are added when polyester is synthesized or is molded into a film, is advantageous due to the fact that it is possible to freely select the amount and the diameter of particles and stabilize the polymer properties and the shape of particles polymer even when operating for long time. However, in dependence on the kind and the size of the particles, macro granules are formed by the aggregation of the particles, so that, when the film is used as, for example, a base film of magnetic tape, there occur disadvantages, such as drop out and the like. Accordingly, the size, density and shape of particles should be controlled.

In general, the more the particle size of polyester large, the more the slip property of the film made of the polyester is improved. However, the particles with large diameters which are included in polyester film in order to improve the slip property of the film may lower the quality of the final product made of the polyester film, such as a video tape, an audio tape and the like, causing the product used in such a precision field as an electromagnetic field to be deteriorated in electromagnetic transit property. Because the polyester film for high density electromagnetic recording medium is required to have not only superior slip property and abrasion resistance but also excellent surface flatness, the protrusions are preferably fine.

SUMMARY OF THE INVENTION

For solving the aforementioned problems, the present inventors have recognized that there is a need of a biaxially stretched polyester film superior slip property and abrasion resistance and improved in surface flatness.

In accordance with the present invention, the above object can be accomplished by providing a biaxially stretched polyester film, comprising: substantially spherical silica particles of colloidal state having average diameters ranging from approximately 20 nm to approximately 200 nm in amounts ranging from approximately 0.005% to approximately 1.0% by weight based on the total weight of the polyester; and alumina particles having average diameters ranging from approximately 50 nm to approximately 500 nm in amounts ranging from approximately 0.05% to approximately 5.0% by weight, the average diameter of the alumina particles being larger than that of the silica particles.

These and other objects and advantages of the present invention will become more apparent as the following description proceeds.

DETAILED DESCRIPTION OF THE INVENTION

During the production of polyester, colloidal silica particles and alumina particles are added, which have different average diameters each other, in accordance with the present invention.

In the present invention, any polyester may be allowed, and it is preferable to use one selected from the group consisting of polyethylene terephthalate, polyethylene 2,6-naphthalate, polyethylene-β-bis(2-chlorophenoxy)-ethane 4,4'-dicarboxylate and polybutylene terephthalate and more preferable to use polyethylene terephthalate.

The colloidal silica particles used in the polyester film according to the present invention may be made by removing alkaline ingredients from sodium silicate as well as in a well-known manner, and substantially spherical particles are used.

According to the present invention, the colloidal silica particles preferably have average diameters ranging from approximately 20 nm to approximately 200 nm and more preferably from approximately 30 nm to approximately 100 nm. For example, if spherical silica particles with average diameters of smaller than 20 nm, the slip property becomes degraded. On the other hand, the particles with average diameters of larger than 200 nm deteriorates the abrasion resistance of the polyester film.

When the polyester is produced, the spherical, colloidal silica particles are efficiently added in amounts ranging from approximately 0.005% to approximately 1.0% by weight based on the total weight of the polyester produced and preferably in amounts ranging from approximately 0.01% to approximately 0.5% by weight. For example, if the amount of the spherical silica particles is less than 0.005% by weight, the slip property and the abrasion resistance of the polyester film produced are decreased. On the other hand, if the amount of the spherical silica is more than 1.0% by weight, the particles are liable to fall off the film, so that the abrasion resistance of the film is deteriorated.

In accordance with the present invention, there are employed alumina particles which have the average diameter larger than that of the spherical, colloidal silica particle, thereby effecting the improvement in slip property and abrasion resistance of the polyester film. The average diameter of the alumina particles used in the polyester film is on the order of from approximately 50 nm to approximately 500 nm and preferably from approximately 80 nm to approximately 300 nm. For example, if the alumina particles with average diameters of smaller than 50 nm, the slip property becomes degraded. On the other hand, the alumina particles with average diameters of larger than 500 nm deteriorates the abrasion resistance of the polyester film.

During the production of the polyester, the alumina particles are efficiently added in amounts ranging from approximately 0.05% to approximately 5.0% by weight based on the total weight of the polyester produced and preferably in amounts ranging from approximately 0.1% to approximately 2.0 by weight. For example, if the amount of the alumina particles is less than 0.05% by weight, the slip property and the abrasion resistance of the polyester film produced are decreased. On the other hand, if the amount of the alumina particles is more than 5.0% by weight, the particles are apt to fall off the film, so that the abrasion resistance of the film is deteriorated.

The coexistence of the silica particles and the alumina particles in the polyester film improve the slip property and the abrasion resistance of the film, according to the present invention. If necessary, there may be used at least one selected from the group consisting of inactivated particles, such as calcium carbonate, calcium sulfate, barium sulfate, kaolin, silica, talc, titanium dioxide and the like.

Addition of the spherical, colloidal silica particles and the alumina particles is carried out in a state of suspension in ethylene glycol, water or the mixture of ethylene glycol and water and preferably in ethylene glycol.

In any step of polyester polymer synthesis process, the suspension of the spherical, colloidal silica particles and the alumina particles may be added and, preferably, in the last stage of esterification or ester exchange reaction.

Biaxially stretched films according to the present invention are obtained from the polyester including the spherical, colloidal silica particles and the alumina particles and can be manufactured in a conventional method. By virtue of the superior surface properties of the biaxially stretched films of the present invention, they can be utilized in a variety of purposes, such as a base film of high density magnetic tape, a condenser film, a package film and the like.

The average diameter of the particles and the properties of the biaxially stretched film according to the present invention are measured and tested as follow:

1. Diameter of Particle.
   A. Average diameter of the powdery particle.
      Silica powdery particles are scattered on a sample board of an electronic microscope so as not to pile them as possible as one can. To the surfaces of the powder scattered, there is deposited gold in thicknesses ranging from approximately 200 Å to approximately 300 Å using a gold sputtering apparatus. Thereafter, pictures for the particles are taken under magnifying power ranging from 1,000 to 2,000 with a scanning electronic microscope. The diameters of at least 1,000 particles were measured and a number average is obtained from the measurements.
   B. Average diameter of the particles in the film.
      Using an epoxy resin, the surface of the biaxially stretched film is fixed, and the film is molded into a bar and cut with a microtome, to prepare a ultra thin sample with a thickness of 50 to 100 nm. Pictures for the particles present in the cut portion of the sample are taken with a penetrative electronic microscope having an acceleration volt of 100 kv. From the pictures, the diameters of at least 1,000 particles are measured and a number average of the diameters is obtained from the measurements.
2. Surface Roughness of the polyester film.
   Center line surface roughness (Ra) was measured using a measuring meter for surface roughness (SE-3H, manufactured by Kosaka Kenkusho, Japan).
3. Slip property and abrasion resistance of the film.
   A. Slip property
      first grade: scratches are few generated on the surface of the film after friction with a guide roll.
      second grade: scratches are a few generated on the surface of the film after friction with a guide roll.
      third grade: a number of scratches are generated on the surface of the film after friction with a guide roll.
   B. abrasion resistance
      first grade: white powder are little generated.
      second grade: white powder are a little generated.
      third grade: a good deal of white powder are generated.

EXAMPLE 1

10 kg of dimethylterephthalate and 6.4 kg of ethylene glycol were fed to a reactor with a refining column. To this reactor, 7 g of manganese acetate was added as a catalyst for ester exchange reaction. The resulting reactants were heated to 200° C. for 3 hours, discharging the methyl alcohol resulting from the ester exchange reaction. After ascertaining that the methyl alcohol was not produced, 4 g of antimony trioxide as a catalyst for polyester polymerization reaction and 4 g of trimethyl phosphate as a heat stabilizer were added in succession. Thereafter, spherical silica particles with an average diameter of 50 nm, dispersed in ethylene glycol were added in an amount of 1% by weight based on the total weight of the polyester to be produced. Removing the ethylene glycol produced in vacuum, the polycondensation reaction was carried at 270° C. for 2.5 hour, so as to produce a polyester A.

A polyester B was obtained in the above manner used to produce the polyester A, except that alumina particles with an average diameter of 100 nm were added in an amount of 1% by weight of the polyester instead of the spherical silica particles.

Mixture of 1 kg of the polyester A, 2 kg of polyester B and 7 kg of polyester without any of the particles were dried in a dryer at 160° C. for 5 hours under a vacuum condition of 300 torr with stirring the mixture.

The resulting dried mixture of the polyesters was charged in a single screw extruder and subjected into melt extrusion at a cylinder temperature of 290° C. The polyester melted was passed through a slit die to give a melted sheet, which was subsequently dropped on a cooling drum, so as to produce a film with a thickness of 200 μm. This film were biaxially stretched 3.5 times at 95° C., respectively and then, fixed under heat for 5 minutes to produce a biaxially stretched film.

The properties of the biaxially stretched film were measured and obtained as follows: first grade of slip property, first grade of abrasion resistance and 0.015 μm of surface roughness.

From the results of the example, it is certain that the film prepared according to the present invention has excellent surface properties such as slip property and abrasion resistance, so that the film may be used for manufacturing final products without scratches and white powders occurring thereon.

Whilst the present invention has been described with reference to certain preferred examples, it will be appreciated by those skilled in the art that numerous variations and modifications are possible without departing from the spirit or scope of the invention as broadly described.

What is claimed is:

1. A biaxially stretched polyester film, comprising:
   substantially spherical silica particles of colloidal state having average diameters ranging from approximately 20 nm to approximately 200 nm in amounts ranging from approximately 0.005% to approximately 1.0% by weight based on the total weight of the polyester; and
   alumina particles having average diameters ranging from approximately 50 nm to approximately 500 nm in amounts ranging from approximately 0.05% to approximately 5.0% by weight, the average diameter of said alumina particles being larger than that of said silica particles.

* * * * *